United States Patent [19]

Saito et al.

[11] Patent Number: 6,074,604

[45] Date of Patent: Jun. 13, 2000

[54] BRAZING MATERIAL FOR STAINLESS STEEL

[75] Inventors: Shinji Saito; Takashi Kayamoto, both of Yokohama, Japan

[73] Assignee: NHK Spring Co., Ltd., Kanagawa-Ken, Japan

[21] Appl. No.: 09/087,205

[22] Filed: May 29, 1998

[30] Foreign Application Priority Data

Dec. 16, 1997 [JP] Japan .................................. 9-346591

[51] Int. Cl.⁷ .............................. C22C 9/06; C22C 19/03; C22C 19/05; C22C 30/00
[52] U.S. Cl. .................. 420/457; 420/473; 420/487; 420/452; 420/587
[58] Field of Search .................. 420/452, 457, 420/587, 473, 487

[56] References Cited

U.S. PATENT DOCUMENTS

| | | | |
|---|---|---|---|
| 981,542 | 1/1911 | Driver | 420/487 |
| 3,198,609 | 8/1965 | Cope | 420/487 |
| 5,004,581 | 4/1991 | Takagi et al. | 420/487 |
| 5,378,294 | 1/1995 | Rissanen | 420/487 |

FOREIGN PATENT DOCUMENTS

| | | | |
|---|---|---|---|
| 1317982 | 1/1963 | France | 420/487 |
| 55-148740 | 11/1980 | Japan | 420/473 |
| 1009631 | 11/1965 | United Kingdom | 420/457 |

*Primary Examiner*—Deborah Yee
*Attorney, Agent, or Firm*—Skjerven, Morrill, MacPherson, Franklin & Friel LLP; Alan H. MacPherson

[57] ABSTRACT

Provided is a brazing filler metal for brazing stainless steel at low temperatures so as not to adversely affect the properties of the stainless steel, and without producing any brittleness in the brazed joint. The brazing filler metal essentially consists of 5 to 30 weight % of Mn or Sn, 20 to 70 weight % of Cu, inevitable impurities, and a balance of Ni. The brazing filler metal may further include no more than 3 weight % of Cr and/or Si.

15 Claims, No Drawings

BRAZING MATERIAL FOR STAINLESS STEEL

TECHNICAL FIELD

The present invention relates to brazing filler metals or brazing alloys for brazing stainless steel of various kinds.

BACKGROUND OF THE INVENTION

Conventionally, Ni, Cu and Ag brazing filler metals have been used for brazing stainless steel. Of these brazing filler metals, Cu and Ag brazing filler metals may not be adequate in some applications where the mechanical strength and the corrosion resistance of the brazed joint are required to be substantially as good as the base material because these brazing filler metals have limited mechanical strength and corrosion resistance. Ni brazing filler metal is relatively preferable for brazing stainless steel as it is favorable in both mechanical strength and corrosion resistance. Ni brazing filler metal is available as Ni—Si, Ni—B and Ni—P base brazing filler metals. Table 1 summarizes the composition, the melting point and the brazing temperature of common Ni-base brazing filler metals.

Ni—P brazing filler metal has a lowest melting point of all Ni-base brazing filler metals, but the P content makes the brazing filler metal unsuitable for use on stainless steel because the P content has a tendency to make iron materials brittle.

BRIEF SUMMARY OF THE INVENTION

In view of such problems of the prior art, a primary object of the present invention is to provide a brazing filler metal for stainless steel which can be brazed at a relatively low temperature so that the mechanical property of the base material may not be adversely affected by the heat required for the brazing.

A second object of the present invention is to provide a brazing filler metal for stainless steel which has a high mechanical strength.

A third object of the present invention is to provide a brazing filler metal for stainless steel which is resistance to corrosion.

A fourth object of the present invention is to provide a brazing filler metal for stainless steel which would not promote the corrosion of the base material.

TABLE 1

|  | composition (%) | | | | | | solid phase line (° C.) | liquid phase line (° C.) | brazing temp. (° C.) |
| --- | --- | --- | --- | --- | --- | --- | --- | --- | --- |
|  | Ni | Cr | B | Si | Fe | P |  |  |  |
| BNi-2 (Ni—B) | bal. | 13.0–15.0 | 2.75–3.5 | 4.0–5.0 | 2.0–4.0 |  | 970 | 1,000 | 1,010–1,175 |
| BNi-5 (Ni—Si) | bal. | 18.0–20.0 | — | 9.75–10.5 |  |  | 1,080 | 1,135 | 1,150–1,205 |
| BNi-6 (Ni—P) | bal. | — | — |  |  | 10.0–12.0 | 875 | 875 | 925–1,025 |
| BNi-7 (Ni—P) | bal. | 11.0–15.0 | — |  |  | 9.0–11.0 | 890 | 890 | 925–1,040 |

Ni—Si (Bni-5) brazing filler metal contains a large quantity of Si (approximately 10% in the case of BNi-5). A small quantity of Si lowers the melting point of the brazing filler metal, but a large quantity of Si could form Ni—Si compounds in the brazed joint. As the Ni—Si compounds are relatively brittle, inclusion of such Ni—Si compounds could compromise the toughness of the brazed joint. In particular, if there is wide clearance in the brazed joint, a phase of Ni—Si compounds tends to grow to such an extent that the possibility of crack formation in this part increases. Also, because the melting point of the brazing filler metal becomes relatively high, exceeding 1,100° C., the heat for the brazing could adversely affect the mechanical properties of the brazed stainless steel.

Ni—B (BNi-2) brazing filler metal contains B so that relatively brittle Ni—B compounds could be formed in the brazed joint. Similarly as Ni—Si (BNi-5) brazing filler metal, Ni—B compounds could substantially reduce the toughness of the brazed joint. The Ni—B compounds which may separate from the material could accelerate the corrosion of the brazed joint. Ni—B brazing filler metal has a relatively low melting point, and can be brazed at a lower temperature than Ni—Si brazing filler metal. Therefore, the likelihood of adversely affecting the mechanical properties of the base material may be reduced, but the possibility cannot be totally eliminated depending on the composition of the stainless steel.

According to the present invention, such objects can be accomplished by providing a brazing filler metal for stainless steel, essentially consisting of: 5 to 30 weight % of at least one member selected from a group consisting of Mn and Sn; 20 to 70 weight % of Cu; inevitable impurities; and a balance of Ni.

Mn, Sn and Cu are components which lower the melting point of the brazing filler metal. If the Mn or Sn content is less than 5 weight %, or when the Cu content is less than 30 weight %, a sufficient lowering of the melting point cannot be accomplished. If the Mn or Sn content is 30 weight % or more, the melting point may be sufficiently lowered, but the brittleness of the brazed joint may become unacceptable. Additionally, the corresponding reduction in the contents of Ni and Cu may reduce the corrosion resistance of the brazing filler metal to an unacceptably low level. In particular, a Mn content of 30 weight % or more may cause excessive oxidization of the brazing filler metal at the high temperature for brazing. More preferably, the Mn or Sn content should be 20% or less in view of ensuring a highly tough brazed joint. If the Cu content exceeds 70 weight %, the corrosion resistance and the mechanical strength of the brazing filler metal will become inadequate as a Ni-base brazing filler metal.

Si also contributes to the lowering of the melting point of the brazing filler metal, and increases the anti-oxidization property of the brazing filler metal. This action may be extremely small when the Si content is less than 0.5 weight %, and a Si content of more than 3 weight % may lead to an unacceptable brittleness in the brazed joint.

Cr is effective in improving the corrosion resistance of the brazing filler metal, but if the Cr content exceeds 3 weight %, the melting point of the brazing filler metal may be raised to an impractically high level.

DETAILED DESCRIPTION OF THE PREFERRED EMBODIMENTS

The brazing filler metals of this group essentially consist of Ni, Cu and Sn, with an optional addition of Si and/or Cr. Table 2 summarizes the composition, the melting point and the tensile strength of a butt joint which is brazed by using the brazing filler metals embodying the present invention.

TABLE 2

| | composition (%) | | | | solid phase line (° C.) | liquid phase line (° C.) | brazing strength (kg/mm²) |
|---|---|---|---|---|---|---|---|
| | Ni | Cu | Sn | Si | Cr | | | |
| 1 | bal. | 48 | 20 | — | — | 977 | 1,000 | 50.3 |
| 2 | bal. | 70 | 20 | — | — | 926 | 943 | 51.1 |
| 3 | bal. | 30 | 20 | — | — | 1,031 | 1,053 | 49.9 |
| 4 | bal. | 42 | 15 | — | — | 1,099 | 1,107 | 52.6 |
| 5 | bal. | 48 | 19 | 1 | — | 967 | 996 | 52.0 |
| 6 | bal. | 48 | 18 | 3 | — | 943 | 984 | 49.7 |
| 7 | bal. | 48 | 19 | — | 3 | 979 | 1,021 | 51.5 |
| 8 | bal. | 48 | 18 | 1 | 1 | 977 | 1,007 | 49.3 |
| 9 | bal. | 56 | 5 | — | — | 1,078 | 1,137 | 50.3 |

As can be seem from Table 2, the tensile strength of a brazed joint according to any one of the brazing filler metals of this group is comparable to that of the base material consisting of stainless steel. The brazing filler metal substantially does not contain B or P which could be a cause of brittleness in the brazed joint. The brazing filler metal also does not contain Si in any significant quantity. Thus, the brazing filler metal substantially does not contain any substance which may be a potential source of brittleness, and can therefore results in a brazed joint which is highly tough.

The melting point of each of the brazing filler metals listed in Table 2 is significantly lower than that of BNi-5 listed in Table 1, and can be even lower than that of BNi-2 depending on the composition of the brazing filler metal. Therefore, the brazing filler metals of the present invention can be used for brazing stainless steel at temperatures which would not adversely affect the properties of the stainless steel. Because the brazing filler metals listed in Table 2 mostly consist of Ni and Cu, they demonstrate a level of corrosion resistance which is comparable to that of conventional Ni-base brazing filler metal.

These brazing filler metals can be applied without changing the existing procedure for applying conventional Ni-base brazing filler metal.

The brazing filler metals of a second group embodying the present invention essentially consist of Ni, Cu and Mn, and Si. Table 3 summarizes the composition, the melting point and the tensile strength of a butt joint which is brazed by using the brazing filler metals embodying the present invention.

TABLE 3

| | composition (%) | | | | | solid phase line (° C.) | liquid phase line (° C.) | brazing strength (kg/mm²) |
|---|---|---|---|---|---|---|---|---|
| | Ni | Cu | Sn | Si | Cr | | | |
| 1 | bal. | 20 | 30 | 1.5 | — | 1,012 | 1,057 | 51.8 |
| 2 | bal. | 30 | 30 | 1.5 | — | 1,007 | 1,041 | 50.4 |
| 3 | bal. | 55 | 20 | 0.5 | — | 1,031 | 1,053 | 49.9 |
| 4 | bal. | 48 | 18 | 3 | — | 989 | 1,022 | 51.9 |
| 5 | bal. | 48 | 19 | 1 | 3 | 1,044 | 1,056 | 51.0 |
| 6 | bal. | 48 | 18 | 1 | 1 | 1,037 | 1,075 | 49.4 |
| 7 | bal. | 70 | 5 | 3 | — | 1,026 | 1,052 | 52.5 |

As can be seen from Table 3, the tensile strength of a brazed joint is comparable to that of the base material consisting of stainless steel. The brazing filler metal substantially does not contain B or P which could be a cause of brittleness in the brazed joint. The brazing filler metal also does not contain Si in any significant quantity. Thus, the brazing filler metal substantially does not contain any substance which may be a potential source of brittleness, and can therefore result in a brazed joint which is highly tough.

The melting point of each brazing filler metals listed in Table 3 is significantly lower than that of BNi-5 listed in Table 1. Therefore, the brazing filler metals of the present invention can be used for brazing stainless steel at temperatures which would not adversely affect the properties of the stainless steel. Because the brazing filler metals listed in Table 3 mostly consist of Ni and Cu, they demonstrate a level of corrosion resistance which is comparable to that of conventional Ni-base brazing filler metal.

These brazing filler metals can be applied without changing the existing procedure for applying conventional Ni-base brazing filler metal.

Although the present invention has been described in terms of preferred embodiments thereof, it is obvious to a person skilled in the art that various alterations and modifications are possible without departing from the scope of the present invention which is set forth in the appended claims.

What is claimed is:

1. A brazing filler metal for stainless steel, consisting of:
   5 to 20 weight % of Sn;
   30 to 70 weight % of Cu;
   inevitable impurities; and
   a balance of Ni.

2. A brazing filler metal for stainless steel, consisting of:
   5 to 20 weight % of Sn;
   20 to 70 weight % of Cu;
   inevitable impurities; and
   a balance of Ni.

3. A brazing filler metal for stainless steel, consisting of:
   5 to 20 weight % of Sn;
   30 to 70 weight % of Cu;
   0 to 3 weight % of Cr;
   inevitable impurities; and
   a balance of Ni.

4. A brazing filler metal for stainless steel, consisting of:
   5 to 20 weight % of Sn;
   30 to 70 weight % of Cu;
   0 to 3 weight % of Si;
   inevitable impurities; and a balance of Ni.

5. A brazing filler metal for stainless steel, consisting of:
5 to 20 weight % of Sn;
20 to 70 weight % of Cu;
0 to 3 weight % of Cr;
inevitable impurities; and
a balance of Ni.

6. A brazing filler metal for stainless steel, consisting of:
5 to 20 weight % of Sn;
20 to 70 weight % of Cu;
0 to 3 weight % of Si;
inevitable impurities; and
a balance of Ni.

7. A brazing filler metal for stainless steel, consisting of:
about 20 weight % of Cu;
about 30 weight % of Mn;
about 1.5 weight % of Si;
inevitable impurities; and
a balance of Ni.

8. A brazing filler metal for stainless steel, consisting of:
about 30 weight % of Cu;
about 30 weight % of Mn;
about 1.5 weight % of Si;
inevitable impurities; and
a balance of Ni.

9. A brazing filler metal for stainless steel, consisting of:
about 55 weight % of Cu;
about 20 weight % of Mn;
about 0.5 weight % of Si;
inevitable impurities; and
a balance of Ni.

10. A brazing filler metal for stainless steel, consisting of:
about 48 weight % of Cu;
about 18 weight % of Mn;
about 3 weight % of Si;
inevitable impurities; and
a balance of Ni.

11. A brazing filler metal for stainless steel, consisting of:
about 48 weight % of Cu;
about 19 weight % of Mn;
about 1 weight % of Si;
about 3 weight % Cr;
inevitable impurities; and
a balance of Ni.

12. A brazing filler metal for stainless steel, consisting of:
about 48 weight % of Cu;
about 18 weight % of Mn;
about 1 weight % of Si;
about 1 weight % Cr;
inevitable impurities; and
a balance of Ni.

13. A brazing filler metal for stainless steel, consisting of:
about 70 weight % of Cu;
about 5 weight % of Mn;
about 3 weight % of Si;
inevitable impurities; and
a balance of Ni.

14. A brazing filler metal for stainless steel according to claim 4, wherein the Si content is 0.5 weight % or more.

15. A brazing filler metal for stainless steel according to claim 6, wherein the Si content is 0.5 weight % or more.

* * * * *